United States Patent
Miller et al.

(10) Patent No.: US 9,140,522 B1
(45) Date of Patent: Sep. 22, 2015

(54) COMPOSITIONALLY GRADED TRANSPARENT CERAMIC ARMOR

(75) Inventors: Michael E. Miller, Budd Lake, NJ (US); Lyonel E. Reinhardt, Boonton, NJ (US); Stephen Recchia, Flanders, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 472 days.

(21) Appl. No.: 13/603,875

(22) Filed: Sep. 5, 2012

(51) Int. Cl.
  *F41H 5/26* (2006.01)
  *F41H 5/04* (2006.01)
  *C04B 41/85* (2006.01)
  *C04B 41/45* (2006.01)

(52) U.S. Cl.
  CPC .......... *F41H 5/0407* (2013.01); *C04B 41/4533* (2013.01); *C04B 41/4539* (2013.01); *C04B 41/85* (2013.01)

(58) Field of Classification Search
  CPC ..... F41H 5/0407; F41H 5/0414; C03C 10/00; C03C 10/0009; C04B 2235/9653; C04B 35/00; C04B 35/62665; C01B 2203/0861
  See application file for complete search history.

(56) References Cited

U.S. PATENT DOCUMENTS

| | | | | |
|---|---|---|---|---|
| 3,633,520 A | * | 1/1972 | Stiglich, Jr. .................... | 109/82 |
| 3,802,850 A | * | 4/1974 | Clougherty .................. | 428/547 |
| 4,069,031 A | * | 1/1978 | Rapp .............................. | 65/33.8 |
| 4,704,943 A | * | 11/1987 | McDougal .................... | 89/36.02 |
| 7,584,689 B2 | * | 9/2009 | Jones et al. .................... | 89/36.02 |
| 7,910,219 B1 | * | 3/2011 | Withers et al. ................ | 428/469 |
| 2009/0136702 A1 | * | 5/2009 | Gu .................................. | 428/49 |
| 2010/0031810 A1 | * | 2/2010 | Neal ............................ | 89/36.02 |
| 2010/0275767 A1 | * | 11/2010 | Pinckney et al. ............ | 89/36.02 |
| 2012/0006190 A1 | * | 1/2012 | Zachau et al. ............... | 89/36.17 |
| 2012/0234164 A1 | * | 9/2012 | Kucherov et al. ............ | 89/36.02 |
| 2013/0224493 A1 | * | 8/2013 | Gabel et al. ................... | 428/410 |
| 2013/0302581 A1 | * | 11/2013 | Mannheim Astete et al. ............................ | 428/214 |
| 2013/0312593 A1 | * | 11/2013 | Carberry et al. ............. | 89/36.02 |
| 2013/0336618 A1 | * | 12/2013 | Danley et al. ................... | 385/78 |
| 2014/0015242 A1 | * | 1/2014 | Forrest ............................ | 283/75 |

* cited by examiner

*Primary Examiner* — Bret Hayes
(74) *Attorney, Agent, or Firm* — Henry S. Goldfine

(57) ABSTRACT

A transparent ceramic composite armor is made of a crystalline transparent ceramic material and an amorphous glass phase material. The armor includes a first portion containing 100 per cent ceramic material; a second portion contiguous and integral with the first portion and containing a combination of the ceramic material and the glass phase material; and a third portion contiguous and integral with the second portion and containing 100 per cent glass phase material. Relative volumetric amounts of the ceramic material and the glass phase material in the second portion are inversely related and a greatest volume percentage of the ceramic material is adjacent the first portion. The volume percentage of the ceramic material in the second portion decreases a direction away from the strike face of the armor, while the volume percentage of the glass phase material increases in the same direction.

13 Claims, 4 Drawing Sheets

COMPOSITIONALLY GRADED TRANSPARENT CERAMIC ARMOR

STATEMENT OF GOVERNMENT INTEREST

The invention described herein may be manufactured, used and licensed by or for the United States Government.

BACKGROUND OF THE INVENTION

The invention relates in general to ceramic composites and in particular to transparent ceramic armor.

Transparent armor is a material or system of materials designed to be optically transparent, yet protect from fragmentation or ballistic impacts. This class of materials is used in diverse applications such as, for example, protective visors for non-combat usage such as riot control or explosive ordinance disposal (EOD) actions. These materials may also be used as vehicle windows in ground, sea, and air vehicles to protect vehicle occupants or equipment (for example, sensors) from terrorist actions or other hostile conflicts. Each of these systems are designed to defeat specific threats, however, there are general requirements common to most.

Composites of ceramic and other materials such as glass and polycarbonate have been suggested as impact resistant transparent armor. For example, United States Statutory Invention Registration No. H1567 describes a transparent composite armor having a hard frangible face plate backed by a more resilient plate. United States Statutory Invention Registration No. H1519 describes the bonding of transparent aluminum oxide or magnesium oxide to a backup plate of transparent plastic. U.S. Pat. No. 7,584,689 issued on Sep. 8, 2009 to Jones et al. discloses a transparent ceramic armor with a laminate design and is incorporated by reference in its entirety herein.

As shown in FIG. 1, a known laminate 10 may include an outer strike layer 12 made of ceramic material, one or more internal layers 14 of glass, and a polycarbonate backing layer 16. Polycarbonate backing layer 16 functions as a spall catch for bullet or armor fragments. Adhesive layers 18 may be used between the other layers 12, 14, 16 to provide some crack mitigation during impact and to reduce stress from differences in the coefficients of thermal expansion.

Survivability of transparent ceramic armor, in terms of multi-hit capability, is a parameter of prime importance. However, the reflection of stress intensity waves is maximized in existing ceramic-glass "laminate" designs such as laminate 10. This is an undesirable feature and can lead to accelerated self-defeat of the transparent ceramic. A need exists for transparent ceramic armor that is better able to withstand and survive multiple hits.

SUMMARY OF THE INVENTION

One aspect of the invention is a transparent ceramic composite armor made of a crystalline transparent ceramic material and an amorphous glass phase material. The armor has a strike face and an axis perpendicular to the strike face. The armor includes first, second, and third portions. Each portion has a width measured along the axis. The first portion contains 100 per cent ceramic material and includes the strike face. The second portion is contiguous and integral with the first portion. The second portion contains a combination of the ceramic material and the glass phase material. Relative volumetric amounts of the ceramic material and the glass phase material in the second portion are inversely related.

The greatest volume percentage of the ceramic material in the second portion is adjacent the first portion and the volume percentage of the ceramic material in the second portion decreases along the axis in a direction away from the strike face. The third portion is contiguous and integral with the second portion. The third portion contains 100 per cent of the glass phase material. The lowest volume percentage of the glass phase material in the second portion is adjacent the first portion and the volume percentage of the glass phase material in the second portion increases along the axis in the direction away from the strike face.

In one embodiment, the volume percentage of the ceramic material in the second portion decreases linearly along the axis in the direction away from the strike face.

In another embodiment, the volume percentage of the ceramic material in the second portion decreases stepwise along the axis in the direction away from the strike face.

Another aspect of the invention is a method of making a transparent ceramic composite armor that includes melting glass phase material and percolating the molten glass phase material into the ceramic material. The glass phase material may be provided in powder form or in bulk form.

Another method of making the armor includes providing a ceramic substrate made of 100% ceramic material. The ceramic substrate includes a strike face. The face opposite the strike face may be grit blasted to enhance coating adhesion. The method includes depositing a graded, multi-layered coating on the grit blasted face of the ceramic substrate using a plasma torch. The graded, multi-layered coating includes a plurality of layers made of a combination of ceramic material powder and atomized glass phase powder.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

A transparent ceramic composite armor may include a compositional grading of the ceramic-glass interface(s) of the ceramic composite armor. The compositional grading is referred to as Functionally Graded Material (FGM). In general, the FGM approach to ballistic protection originated in ceramic-metal graded designs such as those disclosed in U.S. Pat. No. 3,802,850 issued on Apr. 9, 1974 to Clougherty, which is incorporated by reference in its entirety herein.

In the context of transparent ceramic composite armor, the FGM approach entails the interpenetration of two phases: a transparent polycrystalline ceramic phase with an amorphous glass phase. Stress intensity waves caused by an impact event on the ceramic strike face are better absorbed by the interpenetration of the two phases. Better absorption is accomplished by reducing back-propagation of the stress intensity waves.

Reduction of the stress intensity wave reflection leads to an enhanced survival of the ceramic composite armor with concomitant improvement of multi-hit capability.

Figure 2:
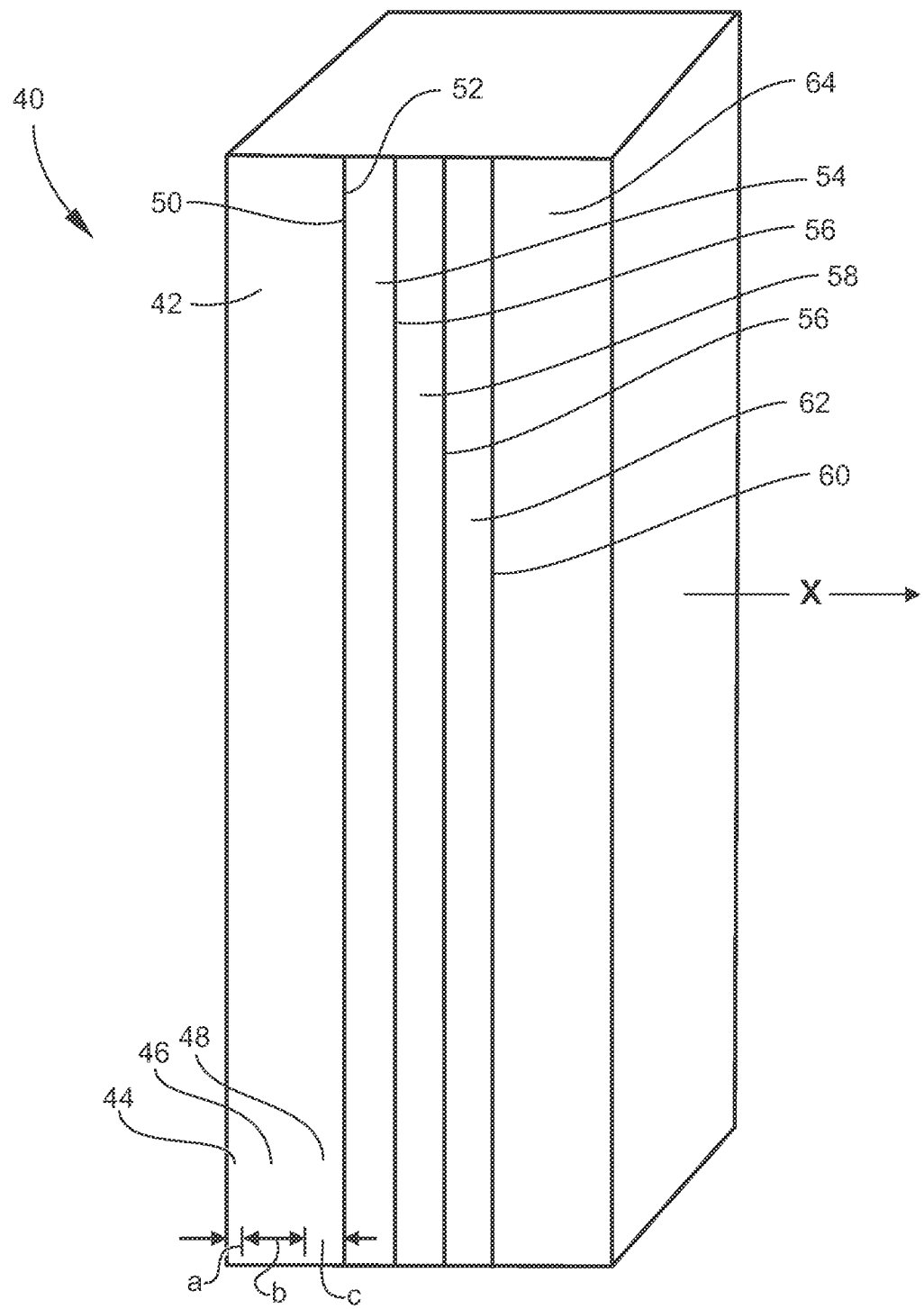
FIG. 2 is a schematic perspective view of one embodiment of a transparent ceramic composite armor.

FIG. 2 shows a transparent ceramic composite armor 40 made of a crystalline transparent ceramic material and an amorphous glass phase material. The ceramic material may be, for example, transparent magnesium aluminate spinel or aluminum oxynitride spinel. The amorphous glass phase material may be, for example, borosilicate, soda-lime, fused silica, or other glasses which may be doped to modify the mechanical properties (e.g., bulk modulus, fracture toughness) of the glass and fracture paths through the glass. Armor 40 may include a strike face 42 and an axis X normal to strike face 42.

Armor 40 may include a first portion 44 having a width "a" measured along axis X. First portion 44 contains 100 per cent of the ceramic material and includes strike face 42.

A second portion 46 of armor 40 has a width "b" along axis X. Second portion 46 is contiguous and integral with first portion 44. Second portion 46 contains a combination of the ceramic material and the glass phase material. Relative volumetric amounts of the ceramic material and the glass phase material in second portion 46 are inversely related. The greatest volume percentage of the ceramic material in second portion 46 is adjacent first portion 44. The volume percentage of the ceramic material in second portion 46 decreases along axis X in the direction away from strike face 42. The lowest volume percentage of the glass phase material in second portion 46 is adjacent first portion 44. The volume percentage of the glass phase material in second portion 46 increases along axis X in the direction away from strike face 42. By way of example, width "b" of second portion 46 is in a range of 0.05 to 0.4 inches.

In some embodiments of armor 40, the volume percentage of the ceramic material in second portion 46 may decrease linearly along axis X in the direction away from strike face 42 and the volume percentage of the glass phase material in second portion may increase linearly along axis X in the direction away from strike face 42. In other embodiments of armor 40, the volume percentage of the ceramic material in second portion 46 may decrease in a stepwise manner along axis X in the direction away from strike face 42 and the volume percentage of the glass phase material in second portion 46 may increase in a stepwise manner along axis X in the direction away from strike face 42.

A third portion 48 of armor 40 has a width "c" measured along axis X. Third portion 48 is contiguous and integral with second portion 46 of armor 40. Third portion 48 contains 100 per cent of the glass phase material. Third portion 48 may include a rear face 50.

Armor 40 may include a first adhesive layer 52 adjacent rear face 50 and a first glass layer 54 adjacent first adhesive layer 52. Additional alternating layers 56, 58 of adhesive and glass, respectively, may be disposed behind first glass layer 54. A last adhesive layer 60 may be disposed adjacent a last glass layer 62 and a spall shield layer 64 may be disposed adjacent last adhesive layer 60. Spall shield layer 64 may be made of, for example, polycarbonate.

Possible methods for fabricating first, second, and third portions 44, 46, 48 of armor 40 include molten glass percolation and thermal plasma spraying. The molten glass percolation method may include two varying methods, one using glass in powder form and one using glass in bulk form. To produce "powder percolated" portions 44, 46, 48, glass phase powder is sieved, for example, through a 32 micron mesh sieve. An aqueous suspension of the sieved glass phase powder is then formed. A layer of the aqueous suspension is uniformly spread on a transparent ceramic substrate made of 100% of the ceramic material. The water in the suspension that is spread on the ceramic substrate is dried off in a kiln. The ceramic substrate and dried suspension are heat treated. The heat treatment causes the glass to melt and penetrate into the polycrystalline ceramic substrate. The ceramic and glass graded material can then be air cooled.

"Bulk percolated" portions 44, 46, 48 may be fabricated by placing a glass slice or slab of a given thickness onto the surface of a transparent ceramic substrate, performing a heat treatment on the glass slice and ceramic substrate, and then cooling down in air.

Thermal plasma sprayed portions 44, 46, 48 may be produced by grit blasting a substrate made of 100% transparent ceramic material. The grit blasting will enhance coating adhesion. The glass powder is atomized to optimize the spraying process. A graded multi-layered glass-transparent ceramic coating is deposited onto the transparent ceramic substrate using a plasma torch. The graded coating is constructed by depositing several layers, one on top of the other. Each layer is created by spraying a mixture of a fixed composition of nanocrystalline ceramic powder and atomized glass powder. The mean composition of the multi-layer coating progressively changes from mostly nanocrystalline ceramic powder (for example, 80% ceramic powder) adjacent the ceramic substrate to mostly glass powder (for example, 80% glass powder) further away from the ceramic substrate and then changes to a 100% glass top layer. Then, the thermal plasma sprayed portions 44, 46, 48 are subjected to a heat treatment.

Figure 1:
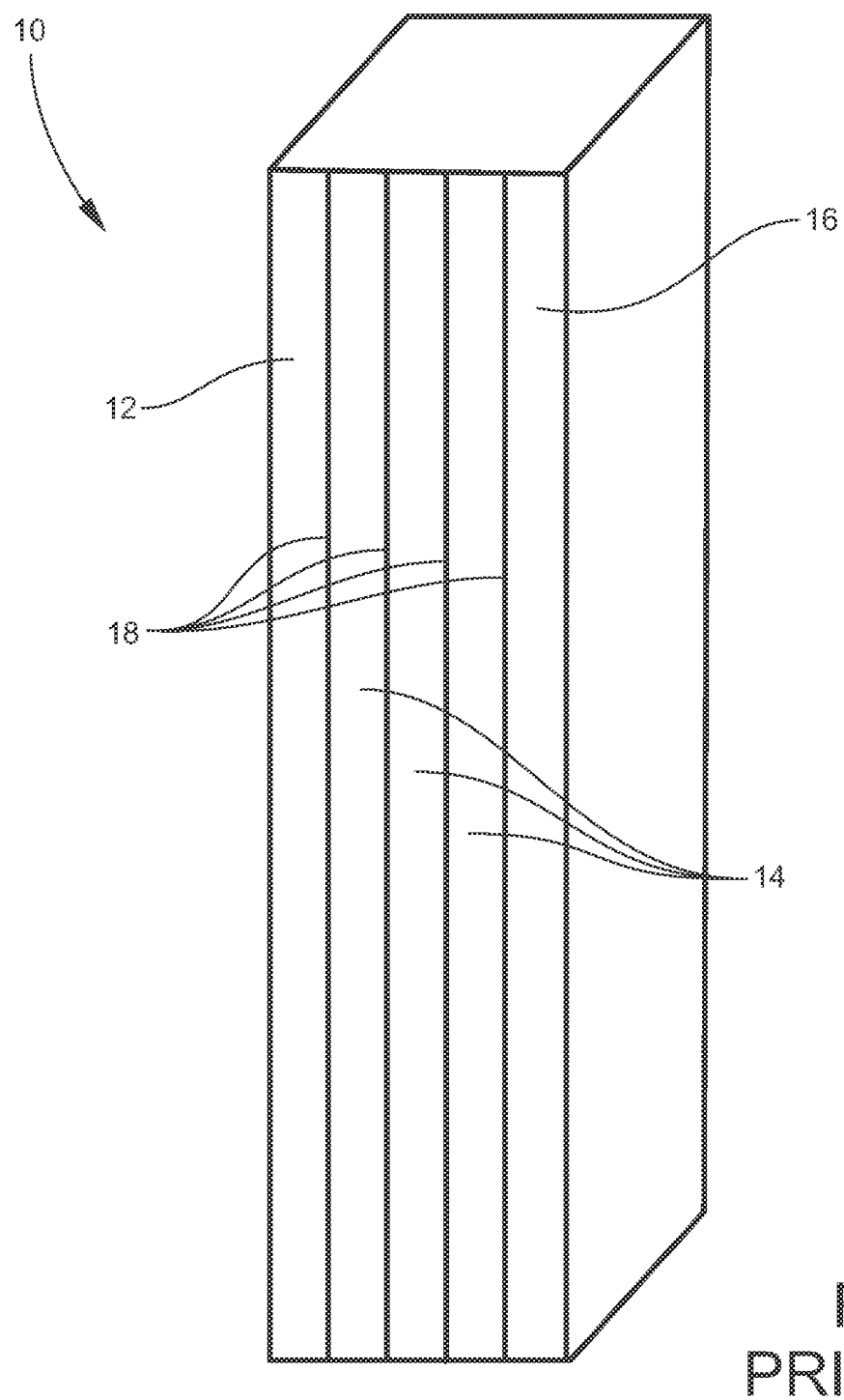
FIG. 1 is a schematic perspective view of a known transparent ceramic armor laminate.
Figure 3:
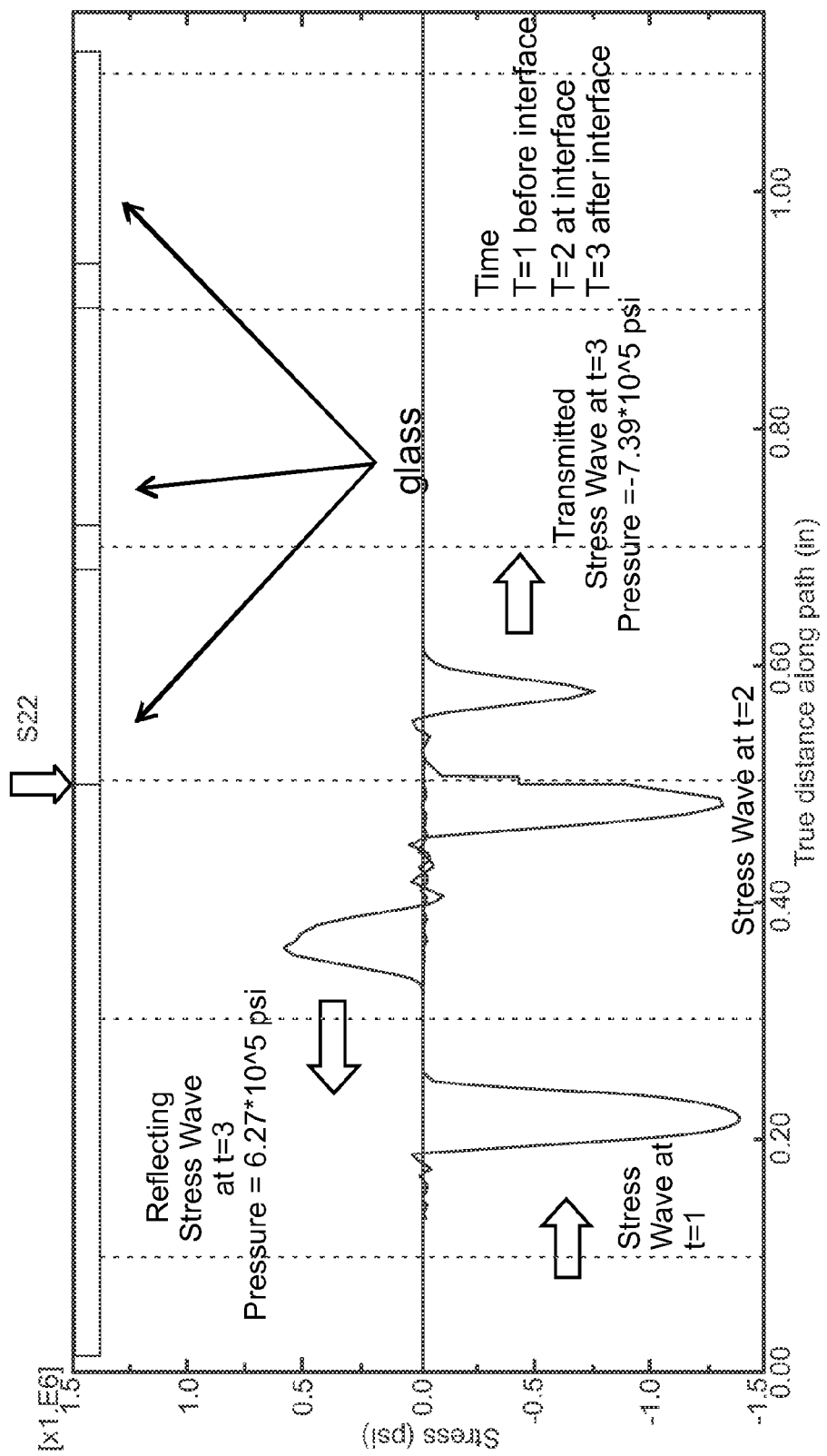
FIG. 3 is a graph of stress vs. distance for a prior art transparent ceramic armor.

Although an embodiment of armor 40 has not been fabricated, computer modeling (Abaqus) demonstrates the advantage of armor 40 compared to prior art laminate designs. FIG. 3 is a graph of stress in psi vs. distance in inches for a prior art transparent ceramic armor, such as armor 10 in FIG. 1. On the distance (x) axis, 0 to 0.5 inches corresponds to ceramic layer 12 in FIG. 1. The arrow S22 points to the interface between ceramic layer 12 and a first glass layer 14. On the distance axis, first glass layer 14 corresponds to 0.5 inches to about 0.7 inches, a second glass layer 14 corresponds to about 0.7 inches to about 0.9 inches, and a final glass layer 14 corresponds to about 0.9 inches to about 1.1 inches.

Figure 4:
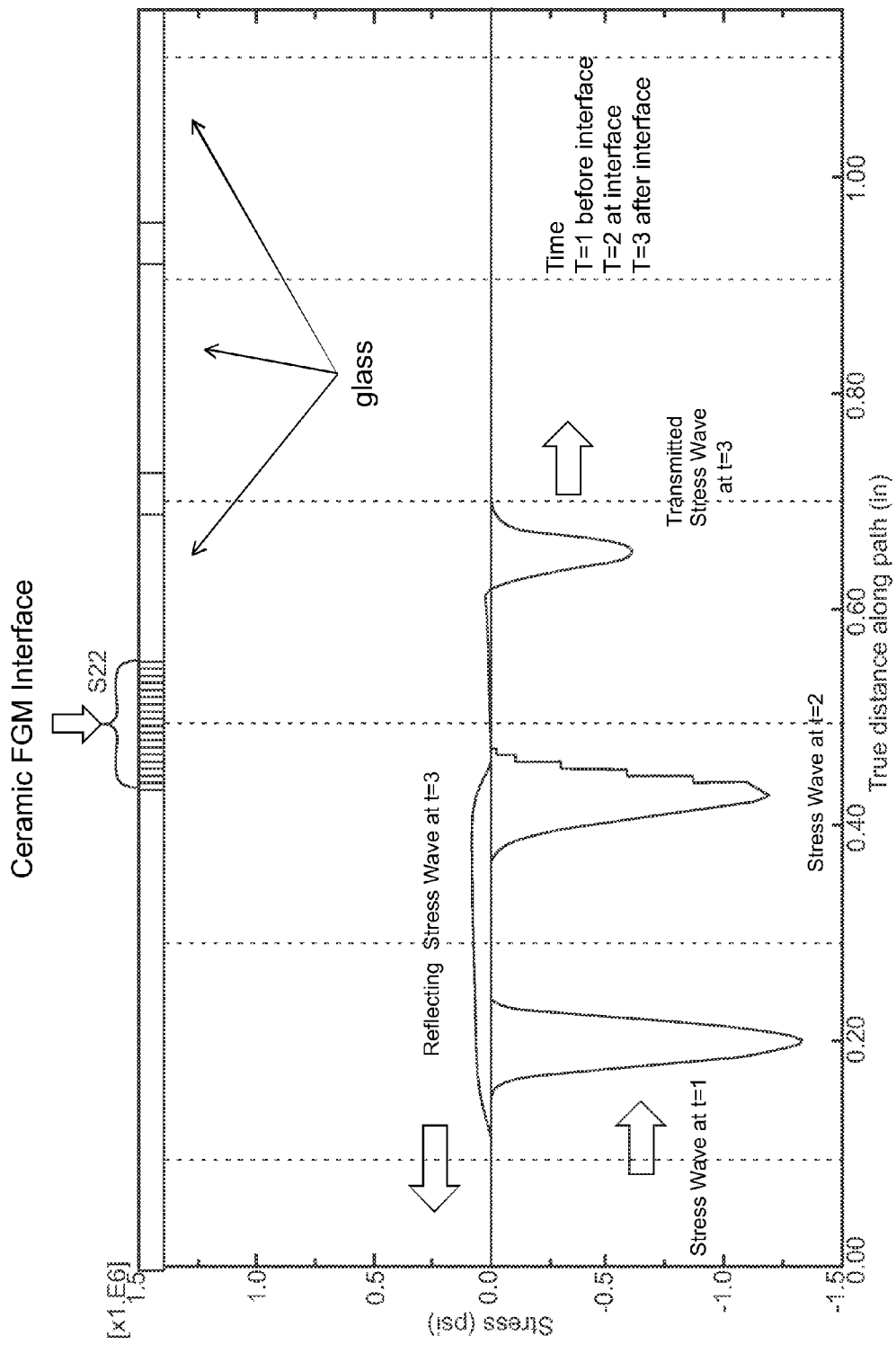
FIG. 4 is a graph of stress vs. distance for a transparent ceramic composite armor.

FIG. 4 is a graph of stress in psi vs. distance in inches for a transparent ceramic composite armor 40. On the distance axis, 0 to about 0.45 inches corresponds to first portion 44 of armor 40; 0.45 inches to about 0.55 inches corresponds to second portion 46 of armor 40; and 0.55 inches to about 0.7 inches corresponds to third portion 48 of armor 40. The amplitude (positive y axis) of the stress wave that is reflected back through ceramic layer 12 (FIG. 3) or the first portion 44 (FIG. 4) is much smaller for first portion 44 of armor 40 than for ceramic layer 12 of the prior art laminate armor 10. The reduction in the reflected stress wave in armor 40 compared to armor 10 should dramatically increase the ability of armor 40 to withstand and survive multiple hits.

The details, materials, steps and arrangement of parts have been described and illustrated to explain the nature of the invention. It will be understood that many changes in the details, materials, steps and arrangement of parts may be made by those skilled in the art, within the principle and scope of the invention, as expressed in the appended claims and equivalents thereof.

What is claimed is:

1. A transparent ceramic composite armor made of a crystalline transparent ceramic material and an amorphous glass phase material, the armor having a strike face and an axis perpendicular to the strike face, the armor comprising:

a first portion having a width measured along the axis, the first portion containing 100 per cent of the ceramic material, the first portion including the strike face;

a second portion having a width along the axis and being contiguous and integral with the first portion of the armor, the second portion containing a combination of the ceramic material and the glass phase material wherein relative volumetric amounts of the ceramic material and the glass phase material in the second portion are inversely related and further wherein a greatest volume percentage of the ceramic material in the second portion is adjacent the first portion and the volume percentage of the ceramic material in the second portion decreases along the axis in a direction away from the strike face; and a third portion of the armor having a width measured along the axis and contiguous and integral with the second portion of the armor, the third portion containing 100 per cent of the glass phase material;

wherein the third portion includes a rear face, the armor further comprising a first adhesive layer adjacent the rear face and a first glass layer adjacent the first adhesive layer; and further comprising additional alternating layers of adhesive and glass disposed behind the first glass layer.

2. The armor of claim 1, wherein the width of the second portion is in a range of 0.05 to 0.4 inches.

3. A method of making the armor of claim 1, comprising:
melting the glass phase material; and
percolating the molten glass phase material into the ceramic material.

4. The method of claim 3, further comprising providing the glass phase material in powder form.

5. The method of claim 4, further comprising sieving the glass phase powder; forming an aqueous suspension of the sieved glass phase powder; applying a layer of the aqueous suspension on the ceramic material; drying water from the aqueous suspension; and then heat treating the glass phase powder and the ceramic material to melt the glass phase powder and to penetrate the ceramic material with the glass phase powder.

6. The method of claim 3, further comprising providing the glass phase material in bulk form.

7. The method of claim 6, further comprising placing a slice of the glass phase material on a surface of the ceramic material and heat treating the glass phase material and the ceramic material.

8. A method of making the armor of claim 1, comprising:
providing a ceramic substrate made of 100% of the ceramic material, the ceramic substrate including the strike face;
grit blasting the ceramic substrate on a face opposite the strike face to enhance coating adhesion;
providing the glass phase material as a powder and atomizing the glass phase powder; and
depositing a graded, multi-layered coating on the grit blasted face of the ceramic substrate using a plasma torch, the graded, multi-layered coating comprising a plurality of layers made of a combination of ceramic material powder and glass phase powder.

9. The method of claim 8, wherein depositing includes spraying the plurality of layers on the ceramic substrate.

10. The method of claim 9, wherein a volumetric composition of the ceramic material powder in the plurality of layers decreases along the axis in a direction away from the strike face of the ceramic substrate.

11. The armor of claim 1, further comprising a last adhesive layer adjacent a last glass layer and a spall shield layer adjacent the last adhesive layer.

12. The method of claim 10, wherein a volumetric composition of the glass phase powder in the plurality of layers increases along the axis in a direction away from the strike face of the ceramic substrate.

13. The method of claim 12, wherein a final layer of the plurality of layers is made of 100% of the glass phase powder.

\* \* \* \* \*